United States Patent
Cox

(10) Patent No.: US 6,460,147 B1
(45) Date of Patent: Oct. 1, 2002

(54) SYSTEM AND METHOD FOR AUTOMATED TESTING OF SOFTWARE SYSTEMS UTILIZING STATISTICAL MODELS

(75) Inventor: Robert Charles Cox, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,209

(22) Filed: Dec. 10, 1998

(51) Int. Cl.[7] ................................................. H04L 1/22
(52) U.S. Cl. .............................. 714/38; 714/25; 703/22; 707/1
(58) Field of Search ........................... 714/2, 6, 15, 20, 714/38, 723, 25, 37, 39, 33; 717/4; 702/123; 703/22; 707/1, 100

(56) References Cited

U.S. PATENT DOCUMENTS

| | | | |
|---|---|---|---|
| 4,744,084 A | * | 5/1988 | Beck et al. .................... 371/23 |
| 5,490,249 A | | 2/1996 | Miller |
| 5,544,308 A | * | 8/1996 | Giordano et al. .............. 714/26 |
| 5,546,321 A | * | 8/1996 | Chang et al. ................ 364/491 |
| 5,548,718 A | * | 8/1996 | Siegel et al. ................... 714/38 |
| 5,586,025 A | * | 12/1996 | Tsuji et al. .................. 395/761 |
| 5,589,765 A | * | 12/1996 | Ohmart et al. ............ 324/158.1 |
| 5,686,833 A | * | 11/1997 | Spinner .................... 324/158.1 |
| 5,869,961 A | * | 2/1999 | Spinner .................... 324/158.1 |
| 5,892,947 A | | 4/1999 | DeLong et al. |
| 5,913,023 A | | 6/1999 | Szermer |
| 6,061,643 A | * | 5/2000 | Walker et al. ............... 702/123 |
| 6,148,277 A | | 11/2000 | Asava et al. |
| 6,349,393 B1 | * | 2/2002 | Cox ............................. 714/38 |

OTHER PUBLICATIONS

U.S. application Ser No. 09/240,923, Cox, filed Jan. 29, 2000.

* cited by examiner

Primary Examiner—Jeffrey Gaffin
Assistant Examiner—Rijue Mai
(74) Attorney, Agent, or Firm—Leslie A. Van Leeuwen; Bracewell & Patterson, L.L.P.

(57) ABSTRACT

The architecture of the Smart Test is described. Instead of writing a script, the Tester designs a functional model of the system to be tested, such as an application. For example, the Tester would model the functions of the system to be tested, such as a main window, a menu bar, drop-down menus, specialized windows etc. The more complete the model, the better the chance testing will cover existing function. The Tester would also define any facts that the model might need (for example, the name of the file to be opened and saved). The Tester then defines any goals or subgoals to be attained. A goal might be saving the file. Then the rules under which the model will operate are defined. One rule might be if the file (named as a fact) has its date and/or time changed, then the goal of saving the file was reached and the test will end.

18 Claims, 13 Drawing Sheets

SYSTEM AND METHOD FOR AUTOMATED TESTING OF SOFTWARE SYSTEMS UTILIZING STATISTICAL MODELS

TECHNICAL FIELD

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF RELATED ART

The present invention involves a method and apparatus for automated software testing. More specifically the present invention provides the Tester with a method and system to describe the software under test without requiring the Tester to know all the details of the software.

Automated software testing can be defined as a program that automatically enters a predetermined set of characters or user commands in order to test new or modified versions of software applications.

Historically it has been observed that there are some serious problems with software automation test case testing tools. One of the key issues is the use of parameters by automation tools. Parameters must be known in advance. As the number of parameters increase, the shear numbers limit what can reasonably be tested.

If test tools can support differing languages, each have a unique set of parameters. If parameters change from one version to another, each different set of parameters requires modification to the system under test and/or the test tool's parameter handling.

Another key issue is that automated tests are likely to be static (i.e. they are primarily derived from manual test scripts). Therefore, to test new or changed functions, the test case must be revised. This is also true if a new or changed parameter is added or revised, respectively. This results in high maintenance.

Yet another key issue is that the function to be tested must exist in some detail for automated test cases to be written. The implication of this is that it is difficult to debug an incomplete function. The coding of the test cases delay the ultimate execution and completion of the testing. In addition, when a new defect is accidentally found outside the testing space, a new test case is required.

The present invention will be better understood and its numerous objects and advantages will become more apparent to those skilled in the art by reference to the following drawings, in conjunction with the accompanying specification.

Currently, it is almost an impossible task to test all the various combinations of parameters within a reasonable time frame. There is no way you can test all parameters, any more than you can test all the paths in White Box Testing. It is NP-complete (from a mathematical point of view, it is believed to be a solvable problem; however, it would take an almost infinite length of time to solve), and even if one does not need to test parameters, one must test them because today's tools need them to work.

Current automated test cases are acceptable for regression testing, but are considered unacceptable for nonregression testing (e.g. development systems). The maintenance as noted is too high. One changed parameter and the test case must be revised. If the vendor changes the tool, it is likely that the test case must be revised. The maintenance of test cases on a developing system is very high. The user must know what all the parameters are and the function they support before they can begin coding the test case.

It would therefore be a distinct advantage to have a method and system that would eliminate many of the above recited problems and concerns. The present invention provides such a method and system.

SUMMARY OF THE PRESENT INVENTION

The present invention, Smart Testing Method For Automated Software Testing, resolves the problems outlined above. Essentially this involves Goal oriented testing that queries the environment and takes action based on facts and a model of the system under test. The action can be modified by rules and exceptions, including training testing to focus on certain behaviors. Regarding the key issues outlined above, the use of parameters can be eliminated. Regarding the issue of automated tests being static and primarily derived from manual static test scripts, the instant system is dynamic quasi-random and can be trained to perform ever changing tasks including classic static emulation. Where, as noted in the prior art, functions to be tested must exist in some detail for automated tests to be written, in the instant system, few functional details are necessary. The instant system can run on an incomplete model.

Test case automation efforts have essentially involved taking a manual script and automating it. To be successful, a Tester must have "up front" knowledge of the details of what they are going to automate. For example, if the Tester wants to automatically select the "Save" menu item, he has to know its in the first drop-down menu for "File" on the main menu bar, and, also, either know its drop-down position or its name. Applicants, in the present invention, have been successful only because their application efforts to date have involved testing existing functions, better known as regression testing.

Assume, for a moment that the "Save" menu item is a new function. All the Tester knows is that there is a requirement for a file save menu item function and if the function succeeds, a file that previously existed will be rewritten with a new date and/or time. If the function fails a pop up window with the word "error" will appear. In the manual testing paradigm this new function would likely have been tested using "gorilla testing". It is, as implied, a random "hunt and pick" manual method of testing, but is not repeatable.

One solution to the test automation problem would be for the Tester to know in advance all the design details. But chances are rare that would happen with any degree of accuracy required to automate the test. Another solution is, thus, proposed in the present invention.

The present Smart Tester invention gives the Tester a method to describe the system under test without having to know all the details of the system.

The architecture of the Smart Test is described as follows. Instead of writing a script, the Tester designs a functional model of the system to be tested. The system could be anything from a single application to a LAN environment. Assume for a moment that the system is an application. The Tester would, for example, model a main window, a menu bar, drop-down menus, specialized windows, etc. The model can be incomplete; however, what is complete must be accurate. For example, if there is no menu bar, the model mentioned above is inaccurate and will not work. The more complete the model, the better the chance the testing will cover existing functions.

The Tester would also define any facts that the model might need; for example, the name of the file to be opened and saved. The Tester then defines any goals or subgoals to be attained. For example, a goal might be saving the file. Then the rules under which the model will operate are defined. One rule might be "if the file (named as a fact) has its date and/or time changed, then the goal of saving the file was reached and the test will end.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

There are two ways a Smart Test can be initiated. First is to take some quasi-random action as defined by the model and then query the result. An alternate way is to first query the system under test. In either case, as soon as the query is completed, a rule engine, whose job it is to modify the behavior of the model, applies rules until either another action can be taken or the test can be completed. The model must run forever if rules do not exist or can never be applied.

This implies that some attainable goal must exist to stop the test. In the case where function is particularly buggy, this should probably be some time limit. Also, goals that are difficult to attain because they represent deep seated or uncommon objectives can be NP-Complete. This is another reason for time limits. However, the problem with deep seated goals can be reduced by the use of sub or interim goals and controlling restart states in the model.

Failures are logged as required. If an "action is taken", it is first checked for exceptions. Exceptions are those things that might destroy future testing, for example, rebooting the machine under test.

Taking quasi-random actions means two things. First, and most important, is that the test can be repeated if necessary, and, second, that the actions can be taken under defined distributions. For example, assume one knows that the average user saves the file ten times for each printing of the file. One can set up a ten to one targeted bin distribution for save versus print; or, one can set up a Gaussian distribution, uniform distribution or whatever is required.

A trace log is created so that history is preserved. It is also created for future enhancements, such as learning the paths to goals, so that future executions in a regression test mode do not have to "guess" their way toward a goal. They can go there directly.

The facts, goals, rules and models are application dependant and would be designed by the Tester. Initialization, actions, queries, exception handling, logging and the rules engines are reusable by the Tester.

Figure 1:
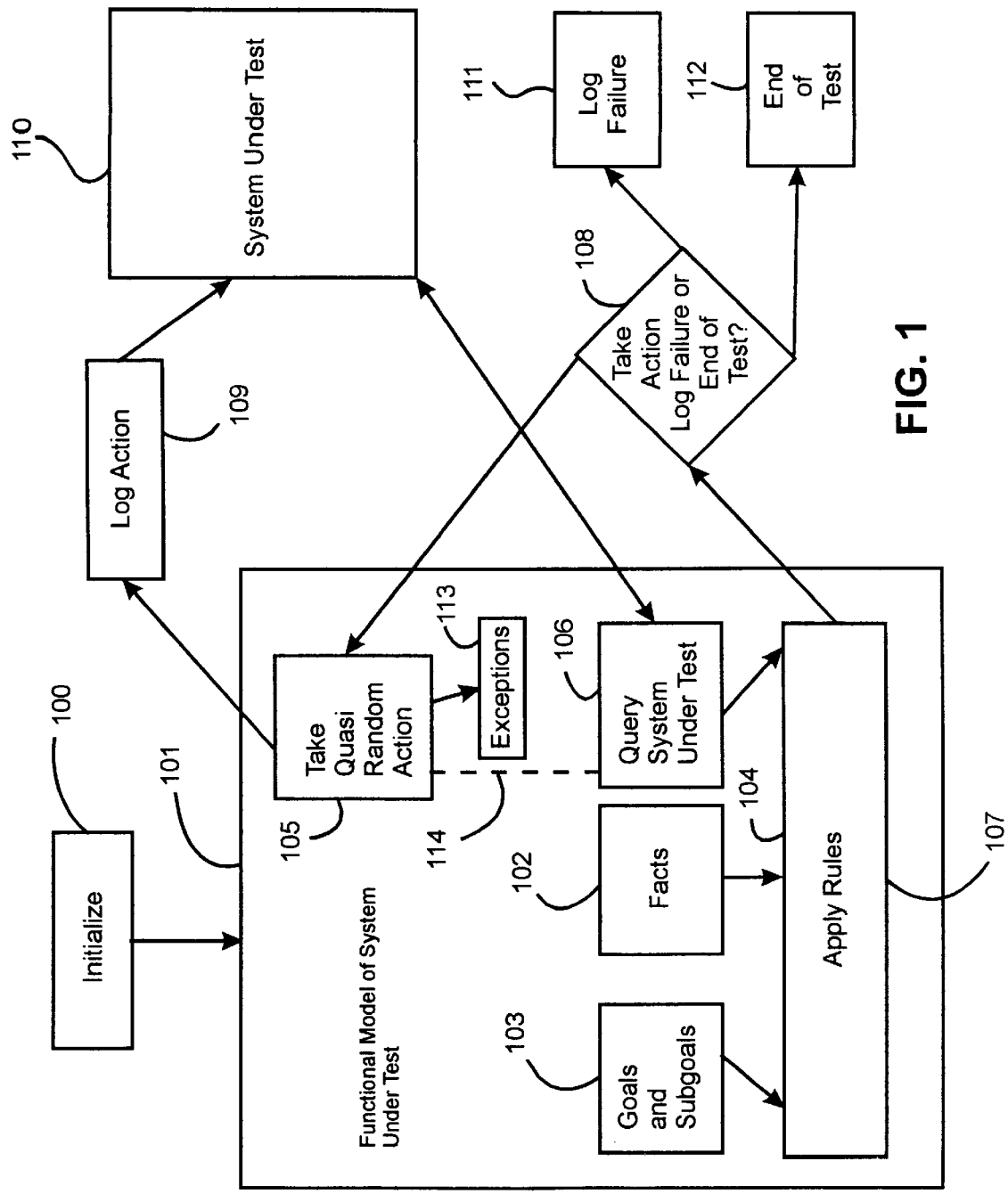
FIG. 1 represents the flow diagram for the Architecture for a Smart Test, the basis for the present invention.

The Testing system is defined in the flowchart, FIG. 1. It should be noted in the Functional Model of System under Test 101, if one initially ignores the goals and subgoals 103, 102 the facts, 113 the exceptions and 112 end of test, you have a single rule that always passes, and assumes that a failure will never stop the test. The execution of the functional model System under test 107 begins by initializing the test 100. Initializing is doing such things as placing the date and time in logs. Then, depending on the system under test 110 and the model of the system under test 101, the execution can either take some quasi-random action 105 or by querying the system under test 106. The choice will most likely be based on the state of the system under test 110. If the state is known (for example, an unexecuted software application), then the quasi-random action to execute some application 105 would be taken first. However, if the state of the system under test is unknown (for example, beginning a test on an execution LAN system), then the query of the LAN system would be appropriate before taking any quasi-random action 105, so 106 would occur first.

Assume that as an example some quasi-random action 105 is taken first. The next action would be logged 109 and taken on the system under test 110. The action would be something like "press the left mouse button on the 'OK' button in application XYZ" or "stop execution of task X on the XYZ LAN". After the action has taken hold (determined by the model), the model of the system under test 101 would query 106, the system under test 110, through an implied path 114 in the model, to determine the effects of the action. Since the rules always pass 107 and failure never stops, a decision will be made 108 to either log a failure 111 and continue another action, or just continue another action where no failure occurs. The test will run endlessly through the path 105, 109, 110–114, 106, 110, 106, 107, 108, 105, 109, 110– . . . or 106, 110, 106, 107, 108, 105, 109, 110–114, 106, 110, 106, . . . in case the query occurred prior to the action.

If we assume there are actions in a test that the user does not wish to take (for example, actions that are destructive), exception 113 detects such actions as defined by the Tester as a special fact 102 and will purposely fail to execute them each time they occur. Facts 102 are simple declarations such as the name of the button 'OK' or the name of a server on a LAN such as 'ServerOne'. Goals 103 are what the Tester is trying to accomplish (for example, find a button called 'OK', or find a message on the LAN with the text "This is a test"). Once goals 103, facts 102 and the result of a query 106 are available, rules 107 can be made to change the behavior of the model 101. For example, one such rule could be "when a goal 103 is reached, then end the test at 112. At this point, the test will stop executing.

Regarding the dotted line 114 between "Take Quasi-Random Action 105 and "Query System Under Test" 106, the following is noted. Immediately after taking 105, 114 the dotted line begins. Depending on the model 101, the dotted line 114 can take one of three forms. In the first case, immediately query System Under Test 106, in the second case, Query 106 once after some predefined delay, or in the third case, query 106 X number of times with some small delay between queries. The normal expectation is that an action 105, performed on the system under test 110, will cause some change in the state of 110 and the query 106 will detect it. For example, if the left mouse button is down (the action) on the 'File' portion of a word processor's menu bar, after a small period of time one would expect to see a drop-down menu with the selection 'Save' (the result of the query). Normally, if the state of the system under test 110 is unchanged, it indicates a failure. Therefore, the result of the query does not indicate the presence of a drop-down menu with the selection 'Save'.

It cannot be said that it will always be the case that an action is expected to produce some change in state. There are tests where an action is taken and the expectation is that nothing will happen. If something does happen, then it is viewed as a failure. The apply Rules 107 sorts out which query at 106 results in a failure 111 and which does not.

The following "Example" demonstrates how the present invention can be used to test the system.

A. Assumptions
1. This testing method is used on the application depicted in FIGS. 2 through 13.
2. None of the application's parameters will be used by the Tester in designing the test.
3. The test is to verify that window H functions are required.
4. The Tester is responsible for the following test definition:
   a. the model (FIG. 1 at 101) of the application (FIG. 1 at 110)
   b. the goals or optional subgoals (FIG. 1 at 103)
   c. the facts (FIG. 1 at 102) required, including any exceptions (FIG. 1 at 113)
   d. the rules (FIG. 1 at 107)
5. The application defines the limits of the testing space.
6. The operating system in which the application executes is outside the testing space.
7. The Smart Test software that manipulates the Tester's test is outside the testing space.
8. The quasi-random selections are based on a uniform distribution.

B. Explanation of the Applications Depicted in FIGS. 2 Through 13

Figure 2:
FIG. 2 shows an empty desktop, or a state of the system when the application is not executing.

FIG. 2 shows an empty desktop, or a state of the system when the application is not executing.

Figure 3:
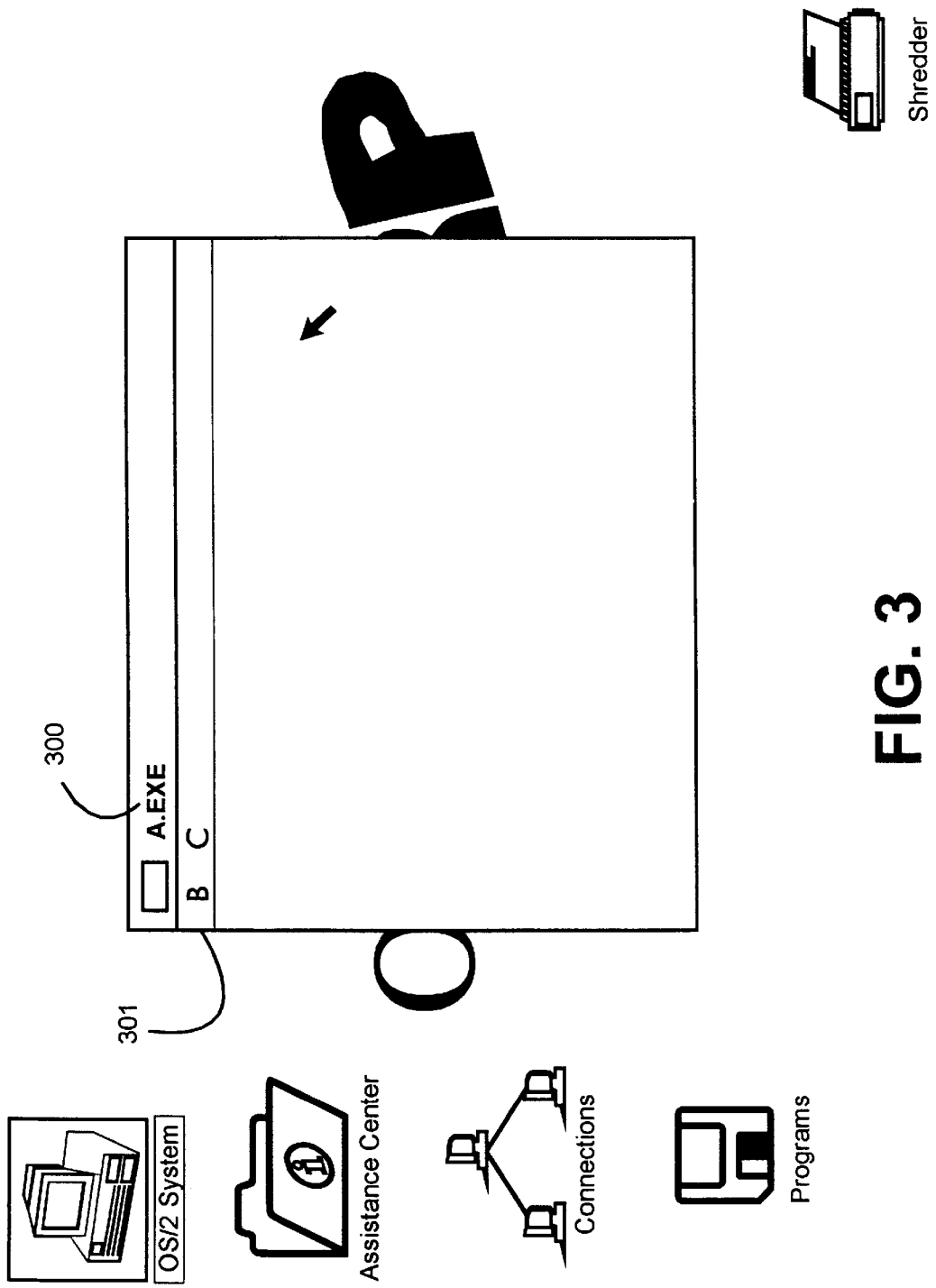
FIG. 3 shows the application after it has been started. Note the window named A and that it has a menu bar with menu items B and C.

FIG. 3 shows the application after it has been started. Note that the window is named A at 300 and that it has a menu bar 301 with menu items B and C.

Figure 4:
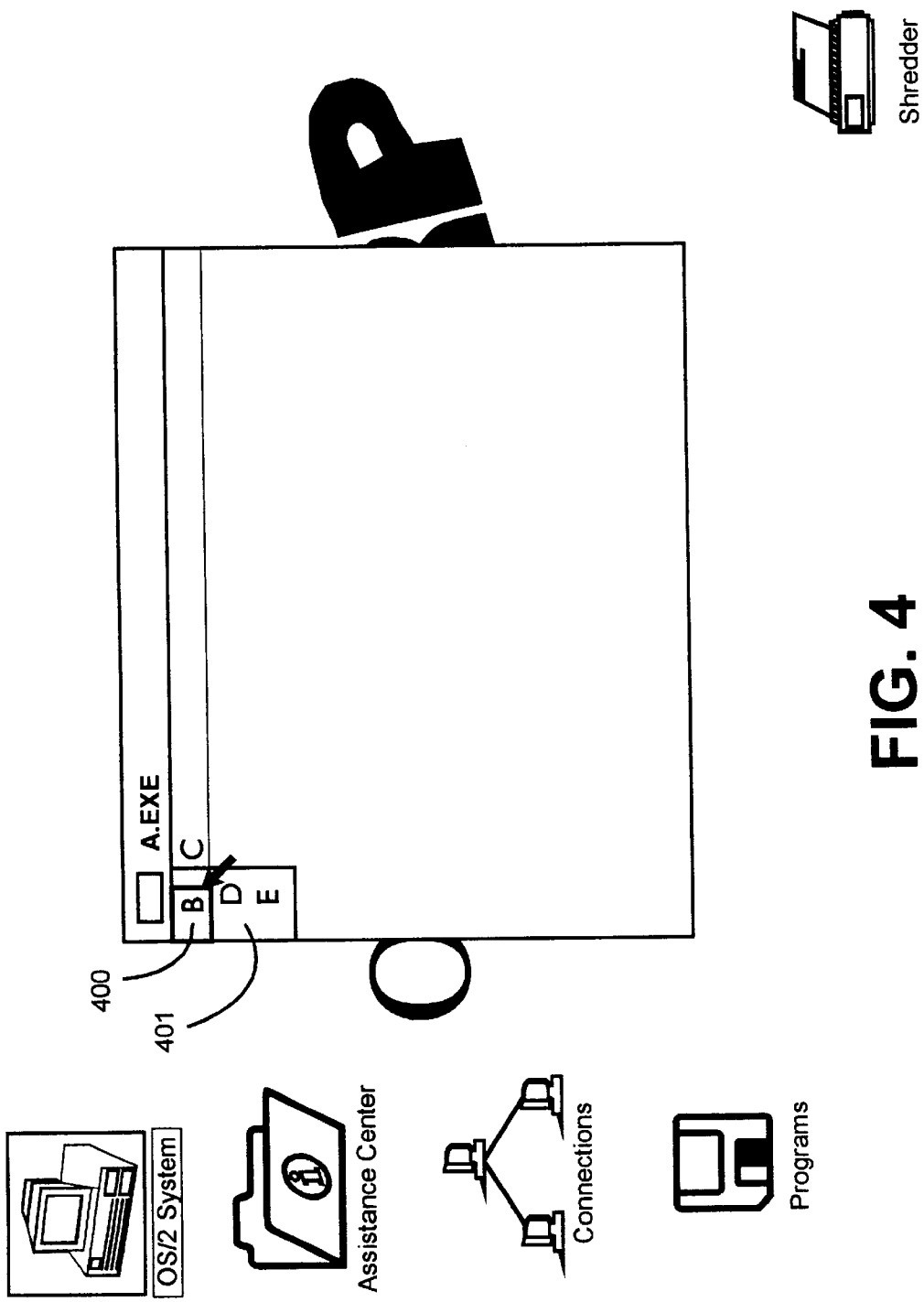
FIG. 4 shows the application when the menu item B is focused. Note the drop-down menu with items D and E.

FIG. 4 shows the application when the menu item B at 400 is focused. Note a drop-down menu 401 with items D and E.

Figure 5:
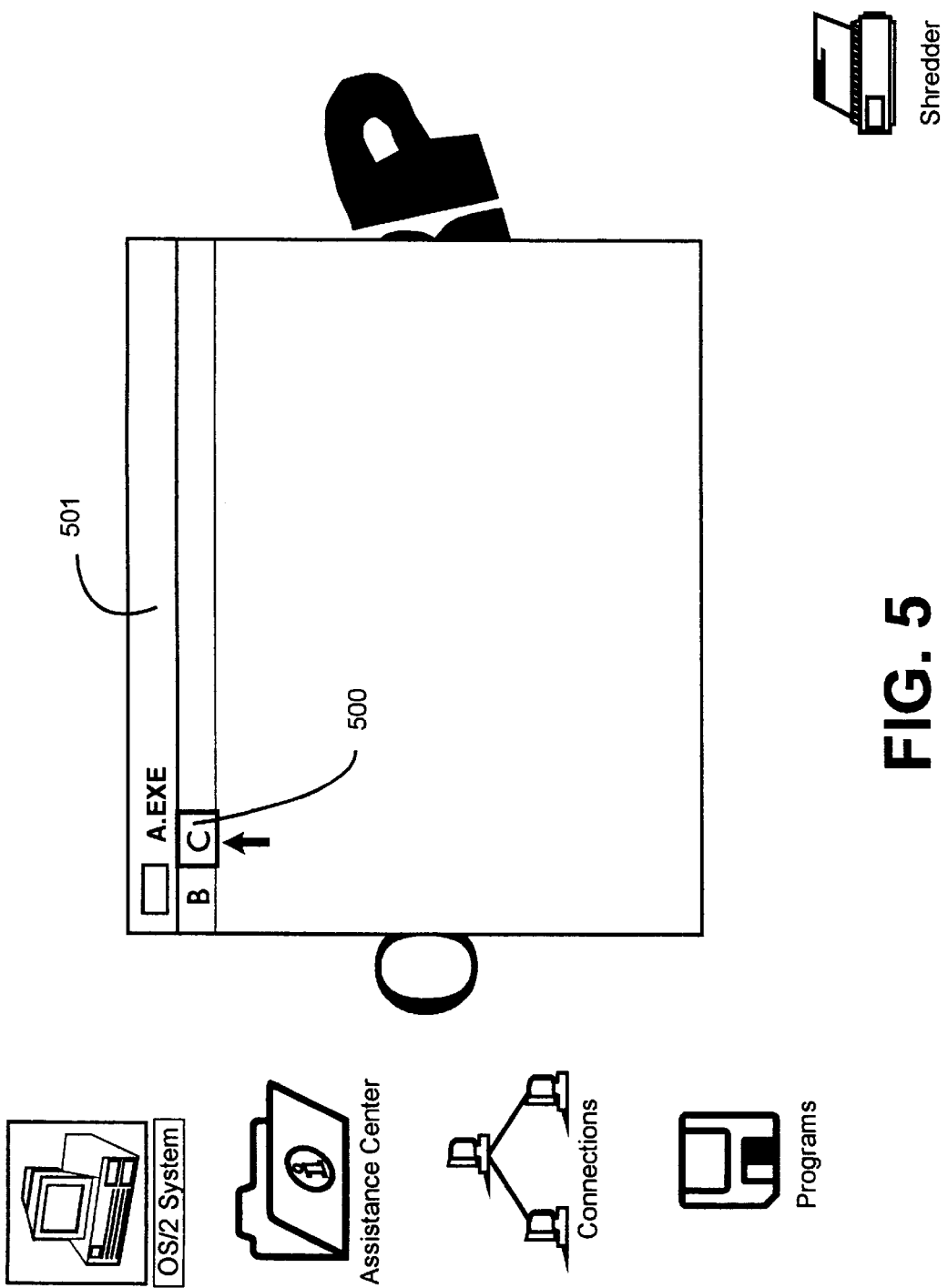
FIG. 5 shows the application when the menu item C is focused. Note the absence of a drop-down menu.

FIG. 5 shows window A at 501 and shows the application when the menu item C at 500 is focused. Note the absence of a drop-down menu.

Figure 6:
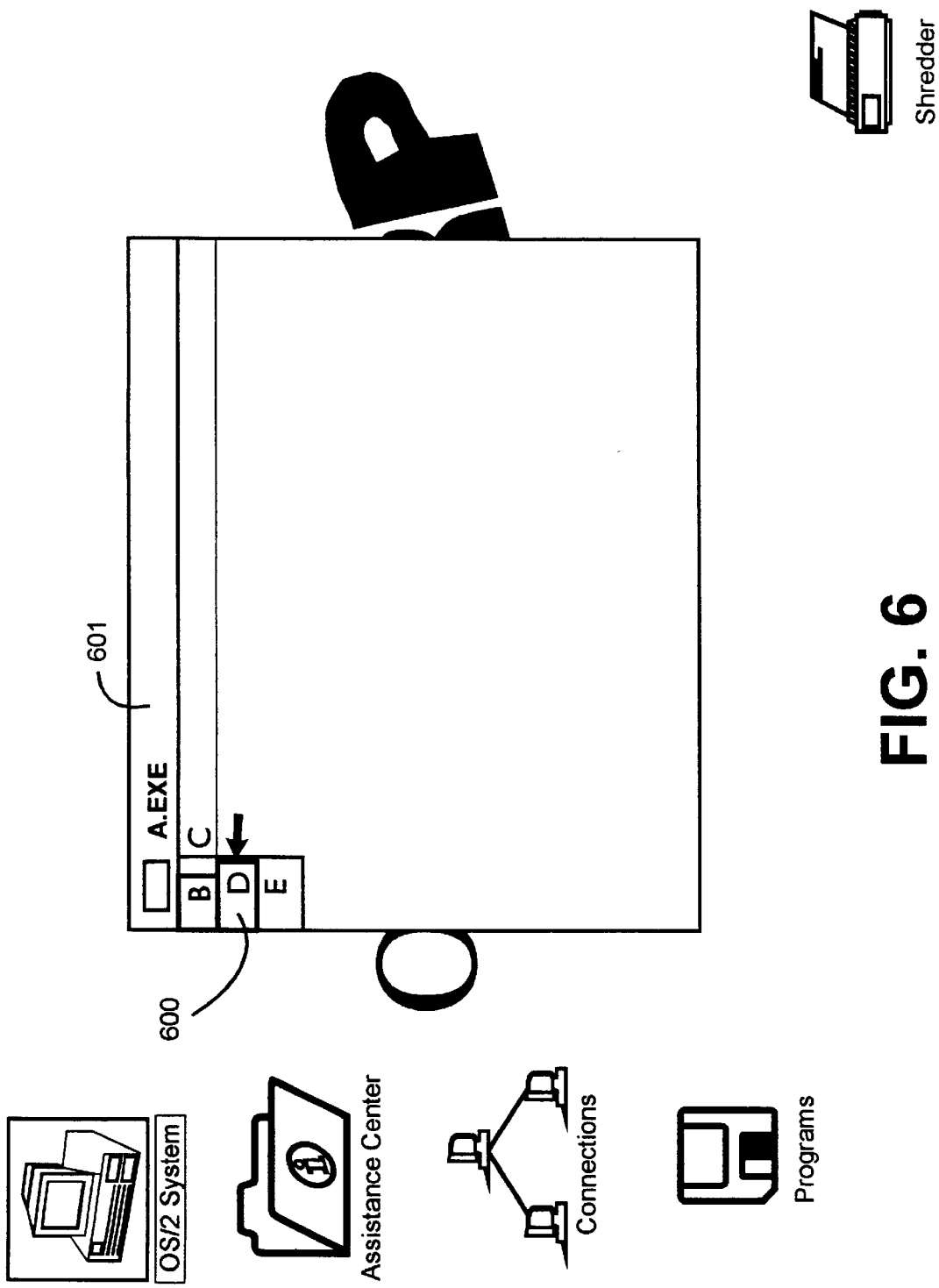
FIG. 6 shows the application when item D is focused. Note the absence of an add on menu.

FIG. 6 shows window A at 601 and shows the application when item D is focused at 600. Note the absence of an add on menu.

Figure 7:
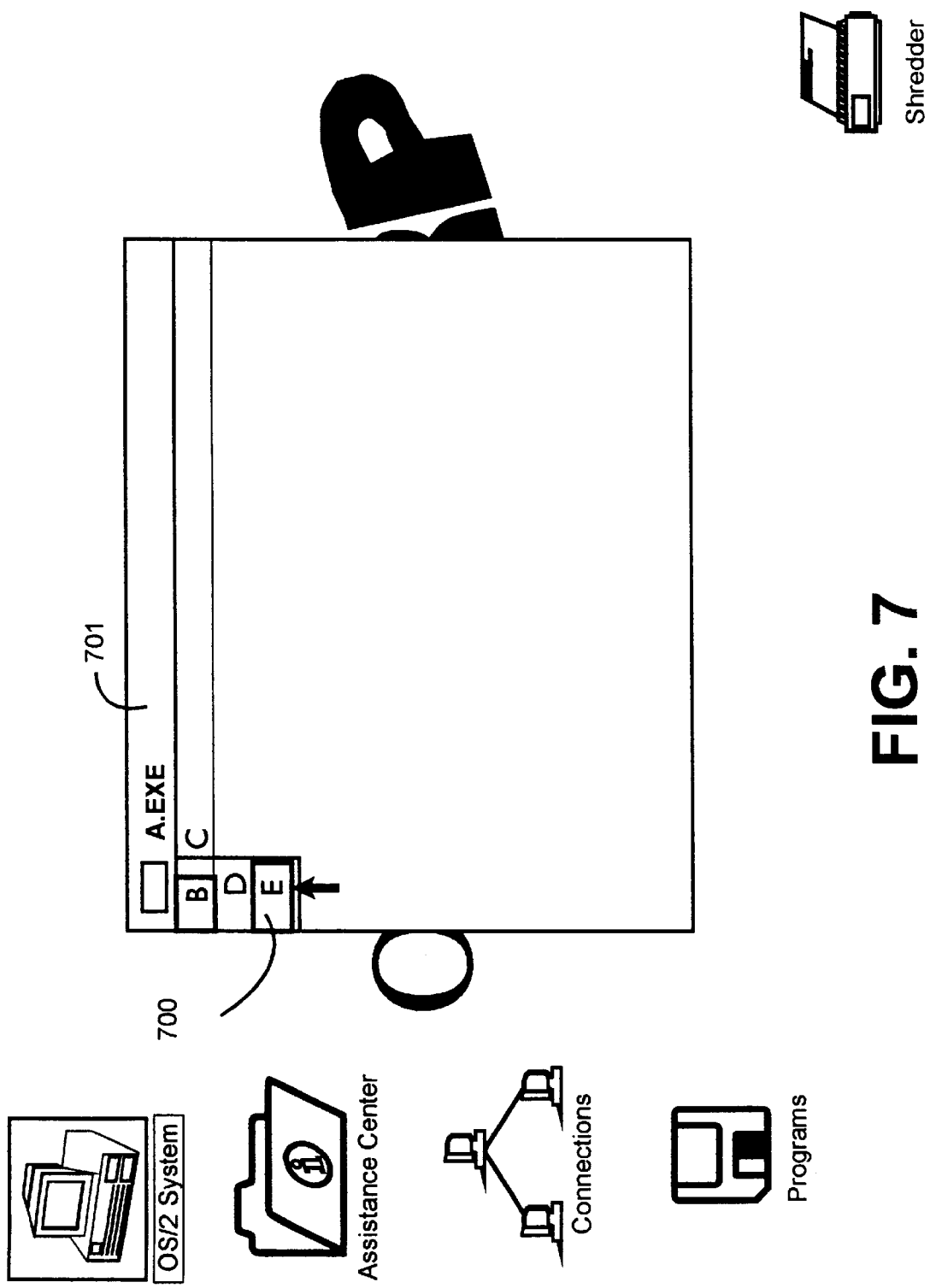
FIG. 7 shows the application when menu item E is focused. Note the absence of an add on menu.

FIG. 7 shows window A at 701 and shows and the application when menu item E at 700 is focused. Note the absence of an add on menu.

Figure 8:
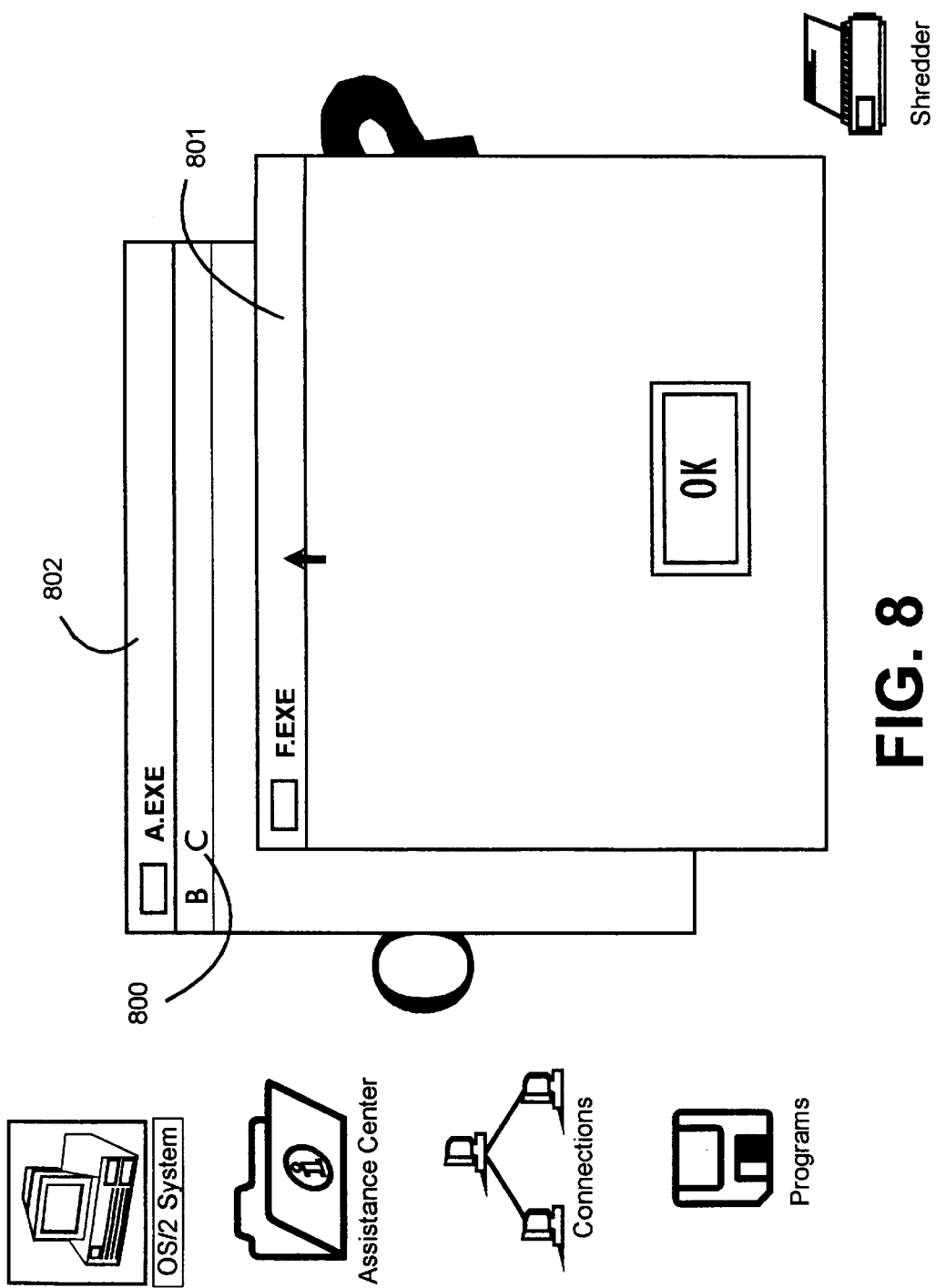
FIG. 8 shows the result of selecting menu item C, window F appears.

FIG. 8 shows window A at 802 and the result of selecting menu item C at 800, window F appears 801.

Figure 10:
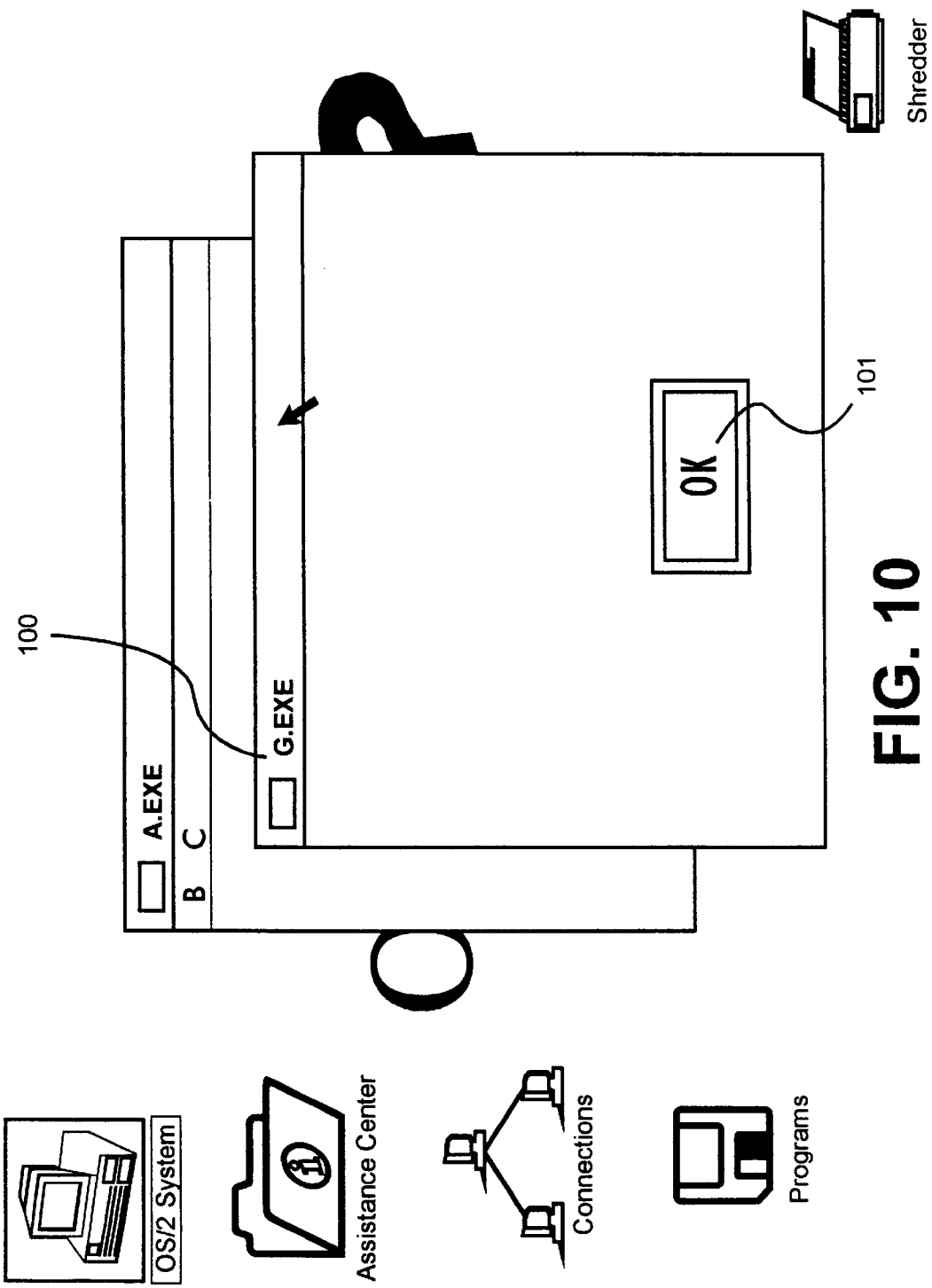
FIG. 10 shows the result of selecting menu item D, window G appears.

FIG. 10 shows the result of selecting menu item D. window G appears at 100.

Figure 12:
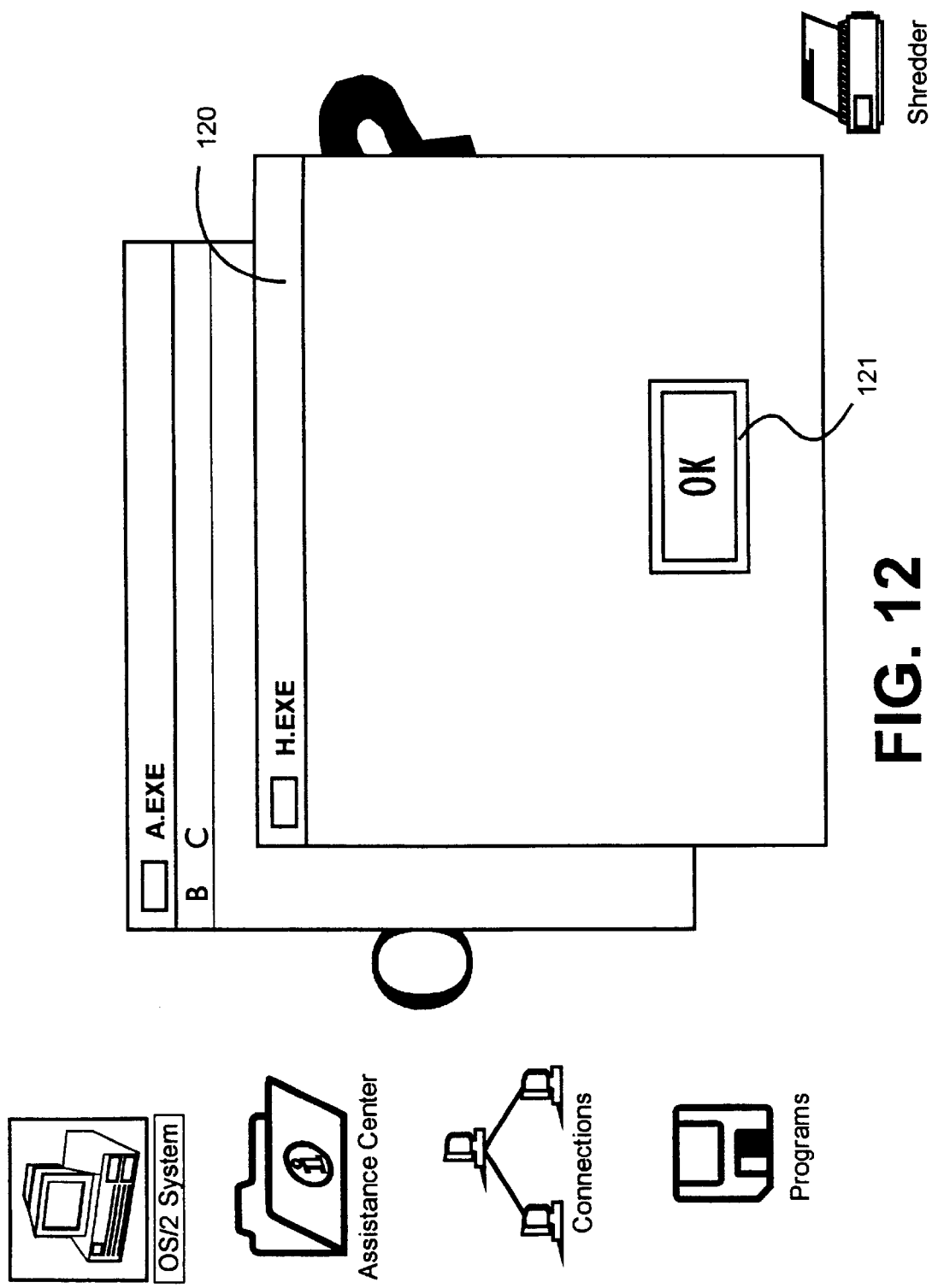
FIG. 12 shows the result of selecting menu item D, window H appears. Windows F, G and H will remain on the desktop until their respective "OK" buttons are selected. When the "OK" button is selected, the suitable window will disappear.

FIG. 12 shows the result of selecting menu item D, window H appears at 120 and the "OK" button at 121. Windows F, G and H will remain on the desktop until their respective "OK" button is selected. When the "OK" button is selected, the suitable window will disappear.

Figure 9:
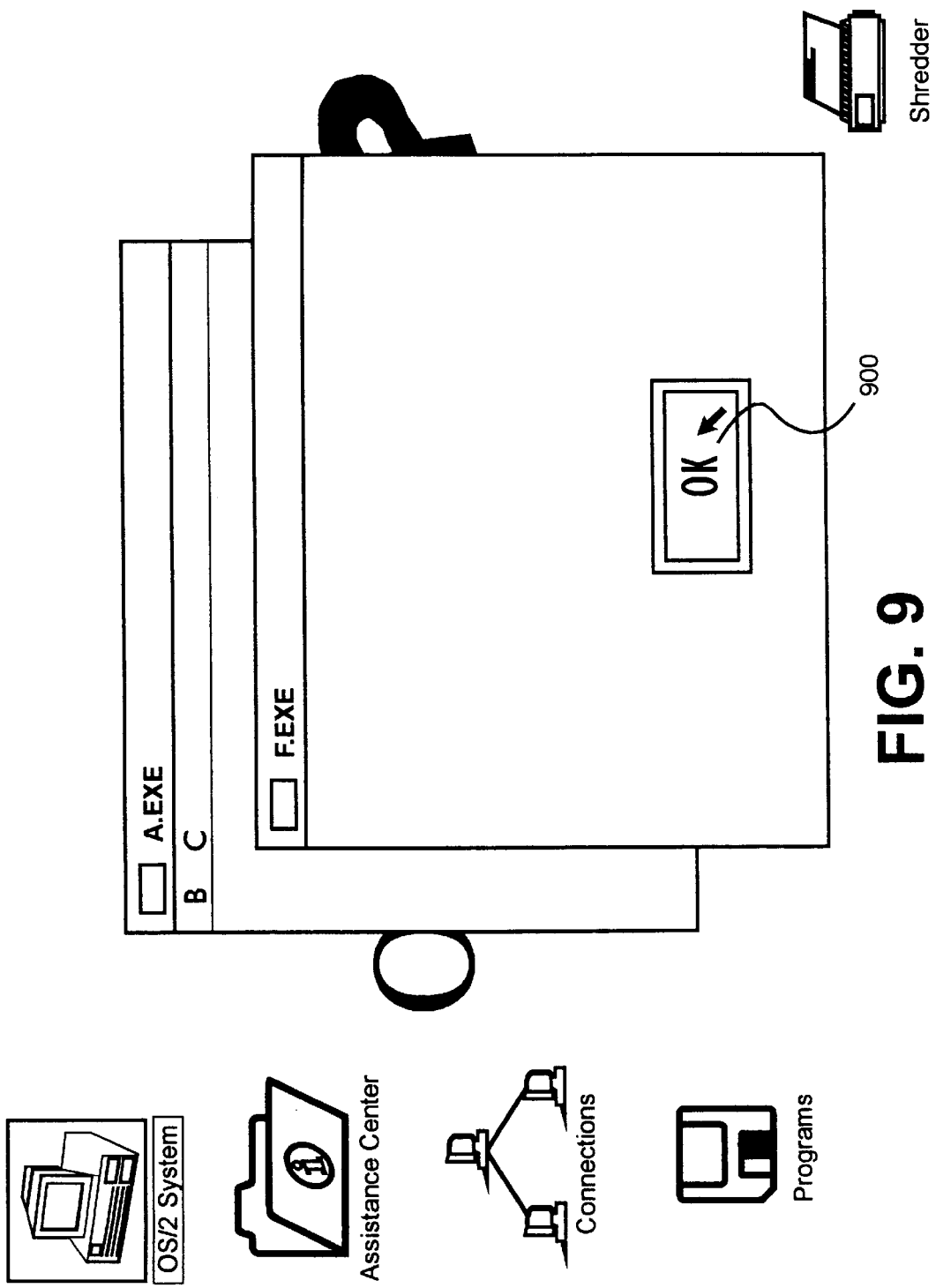
FIG. 9 depicts the selection of the respective "OK" button. When all "OK" buttons have been selected, the application should revert to the state depicted in FIG. 3.
Figure 11:
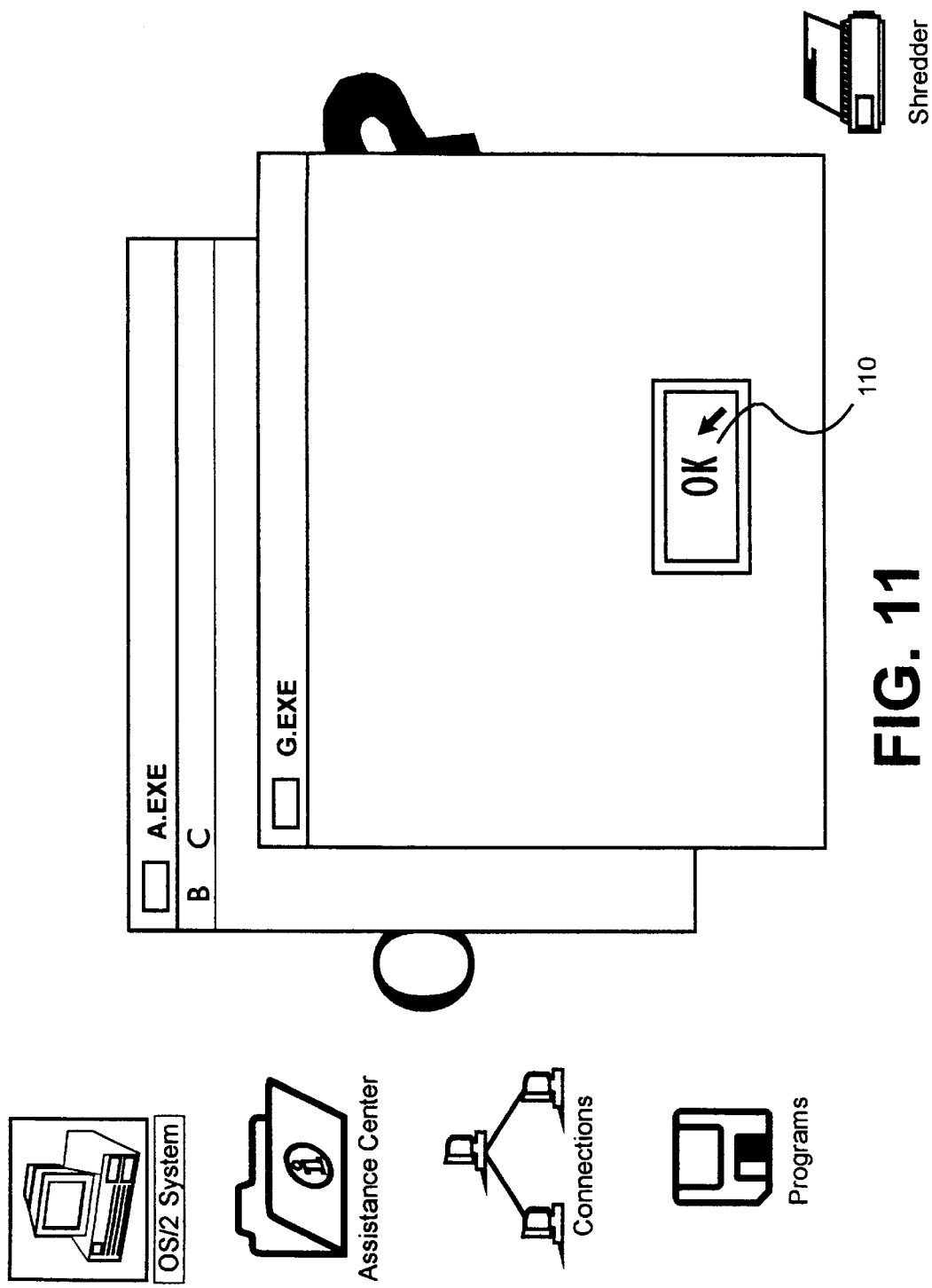
FIG. 11 depicts the selection of the respective "OK" button. When all "OK" buttons have been selected, the application should revert to the state depicted in FIG. 3.
Figure 13:
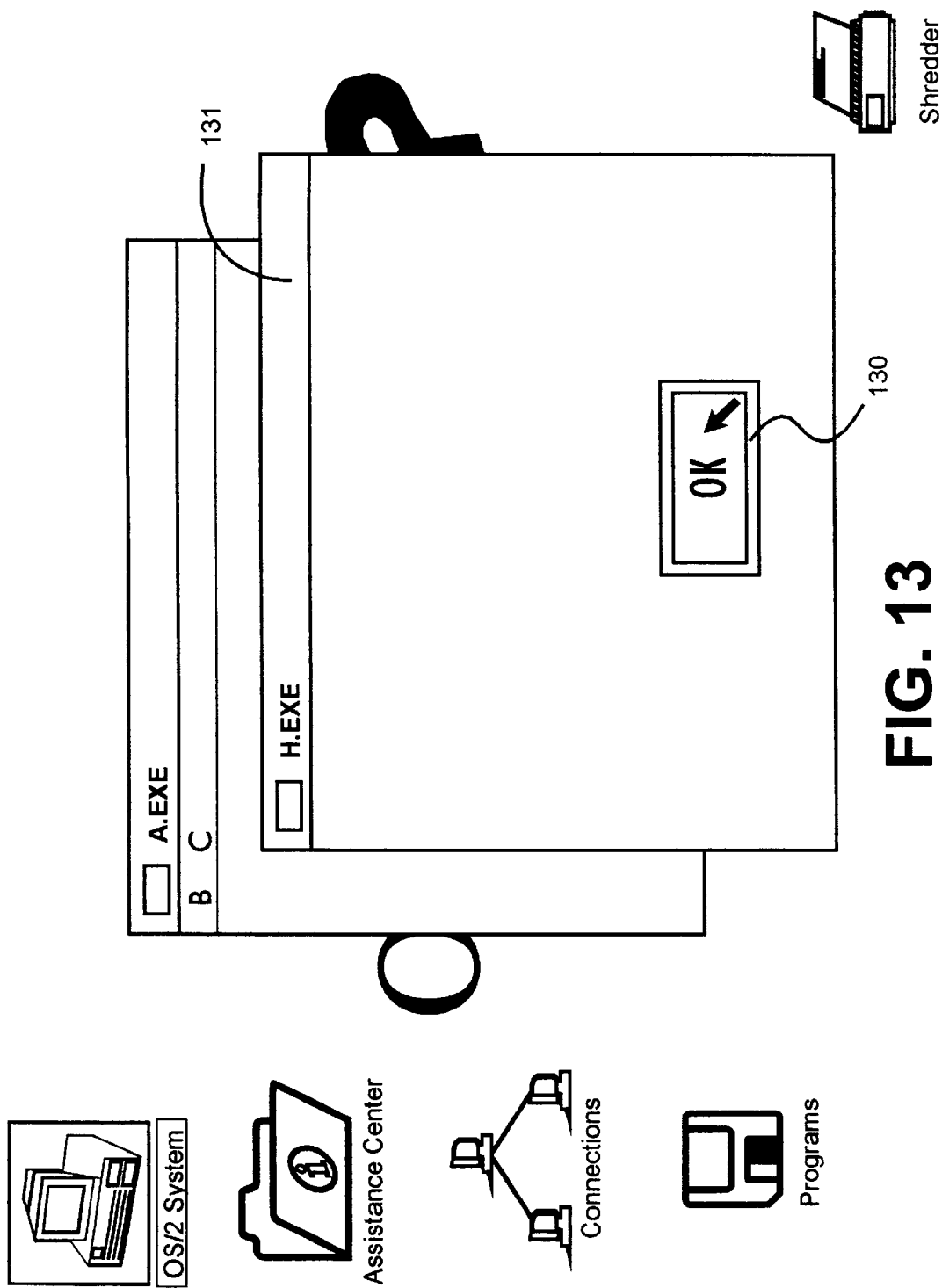
FIG. 13 depicts the selection of the respective "OK" button. When all "OK" buttons have been selected, the application should revert to the state depicted in FIG. 3.

FIG. 9 at 900, FIG. 11 at 110 and FIG. 13 at 130 depict the selection of the respective "OK" button, window H is at 131. When all "OK" buttons have been selected, the application should revert to the state depicted in FIG. 3.

A Model of the application in herarchical tops down order would be:
1. a main window
2. a menu bar
3a. a window or
3b. drop-down menu
4a. a button
4b. a window
5b. a button This model would select menu items until a window appears, then it will close the window by selecting the button.

How the test will be run without the Tester's use of parameters:

First, the application to be tested will be placed in a known directory on an operating system. This allows for starting the application without the Tester having to know it's name. Both the operating system and the Smart Test's Initialize (FIG. 1 at 100) function are outside the testing space, so Initialize can look into the directory, get the application's name and execute it. This action would result in FIG. 2 changing to FIG. 3.

Second, the test if successful or capable of continuing execution with failure *, requires a rule that if met will stop the test. The rule will be constructed statistically. Under uniform distribution, when FIG. 3 is present, menu item B will be selected on average 50% of the time and menu item C will be selected 50% of the time. If menu item B is to be selected (FIG. 4), then on average menu item D and menu item E will be selected 50% of the time, or overall, menu item D and menu item E will be selected 50% times 50% or on average 25% of the time. Menu item E is the one we are interested in in our test because it results in window H (FIG. 12). We can, therefore, assume on average that every fourth window that appears with an "OK" button will be window H. We need only one occurrence to do our test. Assuming a Poisson distribution and running the test for only four occurrences of the "OK" button, then stopping will result in window H being tested only 50% of the time. Assuming a Poisson distribution and running the test for ten occurrences of the "OK" button, then stopping will result in window H being tested 99.8% of the time. We'll assume that 99% or greater is acceptable.

\* designates the case where a failure prohibits "OK" buttons from appearing is ignored, as well as traps, hangs and internal processing errors.

The facts\* would be:
1. the failure log=Failure log
2. the trace log=Trace log
3. the path to the application=d:\test\application
4. the number of buttons required=0
5. Initialization starts the application \* there are no exceptions in this example, an exception might exist if one of the menu items or buttons caused the system to shutdown The goals\* would be:
1. find the number of buttons required \* there are no subgoals in this example, a subgoal might be used to assure an event occurs before the main goal is reached (for example, finding window F before testing for window H).

The rules, FIG. 1 at 107, hierarchical tops down, would be:
1. if the desktop does not contain the main window of the application under test, then log a failure and stop the test
2. if a window, then take no action
3. if the goal is met, then stop the test
4. if the button is pressed and another button exists, then log a failure
5. if buttons exist, then select a button and increase the button count by one
6. if menu items exist, then select one menu item The test would run as follows, assuming no failures:

Initialization assigns the trace.log and failure.log as defined facts. It starts the application under test. The model, FIG. 1 at 101, takes over control of the test. It queries the desktop for the A window. It tests the rules, FIG. 1 at 101, and rule 2, noted above, applies a null action be taken. The model, FIG. 1 at 101, dictates that the application's menu bar is to be queried for it's content. It returns B & C, tests the rules and 6 applies. It then quasi-randomly selects either B or C. The model then indicates that either a window or a drop-down menu will occur. The application is queried for a window first. If F exists, then test the rules and 5 applies. At this point, on this path the model returns to the beginning and runs again. If F does not exist, then a drop-down menu is queried for menu items. It will return D & E. It will test rules and 6 applies. It will then quasi-randomly select D or E. The model then indicates that a window will appear. The window is queried and it is either G or H. Test the rules and 2 applies. A null action is taken. The model then indicates buttons. It returns the "OK" button. Test the rules and 5 applies. At this point, on this path the model returns to the beginning and runs again. After rule 5 has been applied ten times, the goal is met and rule 3 applies. As we assumed no failure for this run, either rule 1 or rule 4 fire. Rule 1 is to cover the case where the application didn't start and rule 4 for the case where the F, G or H windows failed to close.

The test is verified by interrogating the trace and failure logs. The trace log should contain at least one entry of the H window being found. The failure log should contain no failures. Failures are produced from both rules and queries. For example, if the model indicates that buttons should exist and none are found then the query will return a failure.

The following Program Code, written REXX language, demonstrates how the present invention is used for Automated Software Testing.

```
*
$Id: SmarTest.cmd,v 2.2 1998/10/18 23:32:00 rccox Exp $
*/
/* trace ?i */
/*
*****************************************************************
******************
*
*
*
* (c) Copyright, IBM Corporation, 1998
*
* This program is a simple demonstration of a smart automated testing method. A model of
* the system under test, in this case an application, is coded in this program. The
* application under test is driven by quasi random actions. Results are queried and are
* subjected to a simple rules engine that modifies the behavior of the test and validates
* any goals. In this simple example, the validation of a goal will terminate the
* execution of the test. Although the tests appear to be random for each execution, a
* test can be repeated by including the goal and the seed in the command line.
*
* Command Line: SmarTest [goal number] [seed]
*
* Executing SmarTest.cmd without a goal number and seed results in a quasi random
* selection of one of 8 goals and actions performed on the application. The Application
* is called HiWorld.exe and may be run by itself to determine all its functions. Watch out
* for the ones like "Reboot" etc.!
*
* For a quick look, execute SmarTest 1, then SmarTest 1 again. Note that each execution is
* different. Now execute SmarTest 1 X, where X is one on the seed numbers noted in one of
* the previous two executions. Note that the executions where the seed numbers are the same
```

-continued

* are identical. Confirm the above by viewing Trace.log.
*
* This simple demonstration assumes that the only application running is
SmarTest.cmd,
* a REXX program with its extensions, and of course, HiWorld.exe. The quasi
random
* distributions are all uniform, thus goal 1 will likely be found much faster than goal 2
* with all other goals likely being found between these two extremes. Upon
completion,
* the file, Failure.log will contain any failures found and the file, Trace.log will
contain
* a script-like log of all actions taken. The re-usable parts are: Initialize, Actions,
* Queries, Exceptions and Logging. The Facts, Goals, Rules and Model are
application
* dependent. The REXX extension, APMT is used here, but this same architecture
can be
* used with tools such as JavaStar.
*
* Whey would one want to do this? There are many reasons, but the most outstanding
is
* that it is an automated "Gorilla" testing method and you don't need to have a
complete
* understanding of what you are going to be testing. In other words, a true "black
box"
* testing method. It also doesn't require the use of the system under test's parameters.
*
* I'm Bob Cox and can be found in IBM Austin at T/L 678-1795 or
rccox@us.ibm.com.
*
* Defects fixed so far:
* 1. OK button is sometimes pressed twice in a row.
* 2. When the mouse indicator is hid, you can't easily stop this thing.
* 3. The model doesn't run error free when all the rules are eliminated
* 4. Trace log consistency improved
* 5. Robustly designed beep slider bar causes mouse click errors
* 6. Trap when menu item or button can't be found
* 7. Fixed the level 3 model problem created by adding training
* 8. Added some criptic debug messages to be written to screen
*
* New Function added:
* 1. Training
* 2. Find a nonparametric goal
*
* Training:
* Say you want to train this such that a goal can be reached in the shortest amount of
* steps. All you need to do is change the command line as follows:
*
* Command Line: SmarTest [goal number] learn
*
* A message will appear telling you that training is complete. From this point on each
* time you invoke SmarTest with the trained goal number it will run with the shortest
* amount of steps. Try it by entering "SmarTest 1 Learn" and then run "SmarTest 1"
or
* "SmarTest 1 [seed number]". It will run always run the shortest amount of steps.
*
* To untrain the goal, all you need to do is enter the following command line:
*
* Command Line: SmarTest [goal number] forget
*
* You're now back to where the quasi random path to the goal will take place.
*
* Find a nonparametric goal:
* One of the primary advantages of using this testing technique is that it doesn't
require
* the use of parameters. Parameters are those things such as window names, the
position of
* a menu item in the drop down menu, etc. It is easy to see how one could start
HiWorld
* without using it's name. You can do it by putting it into a special directory and then
* starting any application found in the directory. The reason this is not using
parameters
* is because the directory is outside the testing space of the application, HiWorld. It
is
* also easy to see that execution doesn't require parameters as many objects found in
* HiWorld were initially unknown to SmartTest except as a model element. For
example:
* many of the Information drop down menu items. What is not so easy to see is how
you
* define a goal without using parameters. Here's a method:

-continued

```
* Assume you want to find the beep button without naming it because you want your
* test case language independent. First you'll define a goal called
"EnoughButtonsToFindBeep".
* Now you need to find enough of the buttons to insure that at least one is a beep
* button. Then look in the trace log (outside the testing space) to verify you found
one. Goal
* number 8 is a nonparametric goal that when used will find at least one beep button.
Ofcourse,
* training goal number 8 is meaningless because the training solution must converge
on a single
* defined entity. Goal number 8 is multiple undefined entities. But training can be
accomplished in
* two steps. First identify the beep button's name in the trace log. Then make it a
goal. Then train
* that goal.
*
**********************************************************************
*********************
*/
/*
****************************
* Facts
****************************
  */
TestLog = "Trace.log"
FailLog = "Failure.log"
TrainingFile = "Goal"
Application = "HiWorld.exe"
ApplicationWindowName = "Hi, World"
WorkingDirectory = directory()
MenuItemException.0 = 5                  /* the following menu items will not be selected */
MenuItemException.1 = "~Logoff"   /* this will log you off the LAN */
MenuItemException.2 = "S~hutdown" /* this will shut down OS/2 */
MenuItemException.3 = "~Reboot"              /* this will reboot the system */
MenuItemException.4 = "~Hide"                /* this will hide the mouse indicator */
MenuItemException.5 = ""                     /* this is normally the line between menu items */
ButtonException.0 = 1                   /* the following buttons will not be pushed */
ButtonException.1 = ""                  /* an unmarked button */
BeepMenuLevelTwo = "Beep . . . "
BeepWindowName = "Beep settings"
BeepDoneButton = "Done"
CustomCursorWindow = "Custom Cursor"
ColorInformationWindow = "Color Information"
ScreenDimensionWindow = "Screen Dimensions"
MadeGoal = "Off"
Learn = "Off"
CandidatePosition = 0
NoNew = 0
SumTotal = 7
StatisticallySigficicant = 0.588
NewButton.0 = 0
Button = ""
/*
**********************************************************************
******************
* potential Goals - one will be randomly chosen, if not selected in command line
**********************************************************************
******************
  */
Result.0 = 8
Result.1 = "Beep" /* the beep button in the Beep Window */
Result.2 = "Window text is Red" /* text in the Color Information Window */
Result.3 = "Window text is Black" /* text in the Color Information Window */
Result.4 = "Screen Dimensions" /* the Screen Dimensions Window */
Result.5 = "Time since system was booted" /* a Time Window */
Result.6 = "Local time"                 /* a Time Window */
Result.7 = "System Time (UTC)"          /* a Time Window */
Result.8 = "EnoughButtonsToFindBeep" /* find the "Beep" button by nonparametric
means */
signal Initialize /* REXX method to bypass rules */
/*
*******************************
* Rules
*******************************
  */
Rules:
if Learn = "On" & MadeGoal = "On" then do
    call CleanUpApplication
    rc = END_SESSION() ; call LogFunction
```

-continued

```
        rc = Training()
        if rc > 0 then do
            '@del 'TrainingFile||'.? 2>null'
            return 5
        end
        if TrainingCheck > 7 then do
            '@del 'TrainingFile||'.? 2>null'
            say "Training complete."
            return 0
        end
        return 4
    end
    if MadeGoal = "On" then return 0
    if Learn = "On" then do
        File.0 = 0
        call sysFileTree TrainingFile||'.x', 'File.', 'FO'
        if File.0 > 0 then do
            call sysFileSearch "Return code", TrainingFile||'.t', 'LongFileLine.'
            call sysFileSearch "Return code", TrainingFile||'.t', 'ShortFileLine.'
            if LongFileLine.0 > ShortFileLine.0 | LongFileLine.0 = ShortFileLine.0 then do
                do j = 1 to ShortFileLine.0
                    if LongFileLine.j <> ShortFileLine.j then leave
                end
                if j > ShortFileLine.0 | j = ShortFileLine.0 then do
                    KeepIt = lineIn(TrainingFile||'.x', 1, 1)
                    say KeepIt "Keep it"
                    call lineOut TrainingFile||'.x'
                    call lineOut TrainingFile||'.k', KeepIt
                    call lineOut TrainingFile||'.k'
                    '@del 'TrainingFile||'.x'
                    return 4
                end
                call lineOut TrainingFile||'.x'
                '@del 'TrainingFile||'.x'
            end
        end
    end
    if Button = Goal then do
        Button = ""
        rc = PUSHBUTTON_CLICK("Done") ; call LogFunction ; call LogFailure
        return 1
    end
    if Button = "Beep" & Result.8 <> Goal then do
        Button = ""
        return 2
    end
    if Result.8 = Goal then do
        if Button <> "" then do
            do k = 1 to 1
                if NewButton.0 = 0 then do
                    NewButton.0 = 1
                    NewButton.1 = Button
                end
                do j = 1 to NewButton.0
                    if NewButton.j = Button then do
                        NoNew = NoNew + 1
                        TempTotal = SumTotal + 1
                        StatisticTest = NoNew / TempTotal
                        if StatisticTest > StatisticallySigficicant then return 1
                        leave k
                    end
                end
                NoNew = 0
                NewButton.0 = NewButton.0 + 1
                NewButton.j = Button
            end
            SumTotal = SumTotal + 1
        end
        if Button = "Beep" then do
            Button = ""
            return 2
        end
        Button = ""
    end
    if WhatWindowResult = Goal then do
        What WindowResult = ""
        call WAIT(100)
        rc = PUSHBUTTON_CLICK("OK") ; call LogFunction ; call LogFailure
        return 1
```

-continued

```
end
if WhatWindowResult = ScreenDimensionWindow then do
    WhatWindowResult = ""
    return 3
end
if subStr(Text, 1, 18) = subStr(Goal, 1, 18) then do
    Text = ""
    call WAIT(100)
    rc = PUSHBUTTON_CLICK("OK⇋8 ) ; call LogFunction ; call LogFailure
    return 1
end
return 0
/*
******************************
* Initialize
******************************
*/
Initialize:
signal on HALT Name ByeBye
call rxFuncAdd "SysLoadFuncs","RexxUtil","SysLoadFuncs"
call SysLoadFuncs
call rxFuncAdd 'APMTLoadFuncs','APMTEXT','APMTLoadFuncs'
call APMTLoadFuncs
parse upper arg GoalNumber Seed
if GoalNumber > Result.0 then do
    Seed = GoalNumber
    GoalNumber = ""
end
if Seed = "" then Seed = time('S')
TrainingFile = 'Goal'||GoalNumber
File.0 = 0
call sysFileTree TrainingFile||'.xxx', 'File.', 'FO'
if Seed = "LEARN" & GoalNumber <> 0 then do
    Learn = "On"
    TrainingCheck = 0
    Seed = time('S')
end
if (Seed = "FORGET" & GoalNumber <> 0) then do
    'del Goal'||GoalNumber||'.xxx'
    signal ByeBye
end
File.0 = 0
call sysFileTree 'Goal'||GoalNumber||'.xxx', 'File.', 'FO'
if File.0 > 0 then do
    InputRecord = lineIn('Goal'||GoalNumber||'.xxx',1,1)
    InputRecord = lineIn('Goal'||GoalNumber||'.xxx')
    parse value InputRecord with Scratch "Seed = "Seed
    Goal = Result.GoalNumber
    say "Goal = "GoalNumber": ("Goal") and test case has been trained."
    call random 1, Result.0, Seed
end
else do
    if GoalNumber = "" | GoalNumber = 0 then GoalNumber = random(1,Result.0,Seed)
    else call random 1, Result.0, Seed
    Goal = Result.GoalNumber
    say "Goal = "GoalNumber": ("Goal") and Seed = 'Seed
end
if Learn = "On" & File.0 = 0 then do
    TrainingFile = 'Goal'||GoalNumber
    ShortSeed = Seed
    call lineOut TrainingFile||'.xxx', 'Run 'date() time()
    call lineOut TrainingFile||'.xxx', 'Goal = 'GoalNumber' and Seed = "Seed
    call lineOut TrainingFile||'.xxx'
end
if Learn = "Off" then do
    call lineOut Testlog, 'Run 'date() time()
    call lineOut TestLog, 'Goal = 'GoalNumber' and Seed = 'Seed
    call lineOut Testlog
    call lineOut FailLog, 'Run 'date() time()
    call lineOut FailLog, 'Goal = 'GoalNumber' and Seed = 'Seed
    call lineOut FailLog
end
say Learn
TrainingStartPoint:
rc = InitializeTestCase() ; call LogFailure
if rc <> 0 then signal ByeBye
call WAIT(1000)
/*
**********************************************************************
```

-continued

```
/*******
* Model of Application (single subwindow open and single execution model)
*******
  */
BeginApplication:
re = StartApplication() ; call LogFailure
if rc <> 0 then signal ByeBye
MenuSelect:
Level = 1                       /* select an item from the menu bar */
rc = WhatMenu() ; call LogFailure
if rc <> 0 then signal ByeBye
rc = SelectMenuItem() ; call LogFailure
if rc <> 0 then signal ByeBye
Item1 = MenuItem
Item2 = ""
Item3 = ""
rc = Rules()
Level = 2                       /* select an item from the first drop down menu */
WindowName = ApplicationWindowName            /* select an item from the
first drop down menu */
call SELECT_WINDOW ApplicationWindowName, 10
rc = 1
do while rc <> 0
    rc = WhatWindow()
    call SELECT_WINDOW ApplicationWindowName, 10
end
rc = WhatMenu() ; call LogFailure
if rc <> 0 then signal ByeBye
rc = SelectMenuItem() ; call LogFailure
if rc <> then signal ByeBye
Item2 = MenuItem
BeepWindowUp:
if MenuItem = BeepMenuLevelTwo then do          /* If it is the Beep menu item then go
to the Beep window model */
    rc = StartBee() ; call LogFailure
    if rc <> 0 then signal ByeBye
    rc = Rules()              /* apply applicable rules */
    if rc = 1 then signal GoalAttained        /* a goal was found */
    if rc = 2 then signal BeepWindowUp        /* a rule applied */
    if rc = 4 then signal BeginApplication    /* a training return */
    if rc = -1 then signal ByeBye             /* an error return */
    WindowName = ApplicationWindowName        /* no rules applied, so continue */
    rc = SelectWindow() ; call LogFailure
    signal MenuSelect         /* Go back and select a new menu item */
end
    rc = WhatWindow()         /* Make sure the application wasn't exited */
if WhatWindowResult <> ApplicationWindowName then signal BeginApplication  /*
it was */
WindowName = ScreenDimensionWindow            /* See if the Screen Dimensions
Window is up */
call WhatWindow
rc = Rules()
if rc = 1 then signal GoalAttained          /* It was and it's the goal */
if rc = 3 then do           /* it was and it's not the goal */
    call WAIT(100)
    rc = PUSHBUTTON_CLICK("OK") ; call LogFunction ; call LogFailure
    rc = Rules()              /* apply applicable rules */
    WindowName = ApplicationWindowName
    rc = SelectWindow() ; call LogFailure
    signal MenuSelect
end
if rc = 4 then signal BeginApplication     /* a training return */
if rc = -1 then signal ByeBye              /* an error return */
Level = 3
call SELECT_WINDOW ApplicationWindowName, 10
rc = WhatMenu()
if rc <> 0 then signal MenuSelect
rc = SelectMenuItem() ; call LogFailure
if rc <> 0 then signal ByeBye
Item3 = MenuItem
do j = 1 to Result.0        /* check if any of these windows are possible goals */
    WindowName = Result.j
    WindowInQuestion = Result.j
    rc = WhatWindow()
    if WhatWindowResult = WindowInQuestion then do     /* a possible goal found */
        rc = Rules()                 /* check it out */
        if rc = 1 then signal GoalAttained          /* it's a goal */
        if rc = 4 then signal BeginApplication      /* a training return */
        if rc = -1 then signals ByeBye              /* an error return */
```

```
            rc = WhatButtons()                    /* it's not a goal, so close it */
            if rc = 0 then do
                rc = PUSHBUTTON_CLICK("OK") ; call LogFunction ; call LogFailure
                rc = Rules()                     /* apply applicable rules */
            end
        end
end
WindowName = CustomCursorWindow                  /* is it the Custom Cursor Window?
if so rules apply */
rc = WhatWindow()
if WhatWindowResult = CustomCursorWindow then do
rc = WhatButton() ; call LogFailure
    if rc <> 0 then signal ByeBye                /* an error return */
    rc = PushButton() ; call LogFailure
    rc = Rules()
    call WhatWindow
        do while WhatWindowResult = CustomCursorWindow
            rc = WhatButtons() ; call LogFailure
            if rc <> 0 then signal ByeBye        /* an error return */
            rc = PushButton() ; call LogFailure
            rc = Rules()
            rc = WhatWindow()
        end
end
if WhatWindowResult = CustomCursorWindow then do    /* If it is check for rules */
    rc = Rules()
    if rc = 4 then signal BeginApplication       /* a training return */
    if rc = -1 then
    if rc <> 0 then signal MenuSelect            /* applied the rules, go back and select another
menu item */
end
WindowName = ColorInformationWindow              /* is it the Color Information Window?
if so rules apply */
rc = WhatWindow()
if WhatWindowResult = ColorInformationWindow then do
    rc = WhatText() ; call LogFailure
    rc = Rules()
    if rc = 1 then signal GoalAttained           /* it was the goal */
    if rc = 4 then signal BeginApplication       /* a training return */
    if rc = -1 then signal ByeBye                /* an error return */
    call WAIT(100)
    rc = PUSHBUTTON_CLICK("OK") ; call LogFunction ; call LogFailure
    rc = Rules()                                 /* apply applicable rules */
    end
WindowName = ApplicationWindowName               /* enough of this, select a new menu
item */
rc = SelectWindow() ; call LogFailure
signal MenuSelect
GoalAttained:
MadeGoal = "On"
WindowName = ApplicationWindowName               /* goal attained, let everyone know
and shut it down */
rc = SelectWindow() ; call LogFailure
rc = CloseWindow() ; call LogFailure
rc = Rules()
if rc = 4 then do                                /* a good training return */
    MadeGoal = "Off"
    signal TrainingStartPoint
end
if rc = -1 then signal ByeBye                    /* an error return */
if rc = 5 then signal ByeBye                     /* a bad training return */
if rc = 0 & Learn = "On" then signal ByeBye      /* training done */
call lineOut FailLog, "Goal "GoalNumber" attained."
call lineOut FailLog
say "Goal "GoalNumber" attained."
signal ByeBye
/* Application Model subroutines */
StartApplication:                                /* This starts up the application under test */
rc = SELECT_WINDOW(ApplicationWindowName)
if rc = 0 then return 0
rc = StartProgram() ; call LogFailure
call WAIT 1500
WindowName = ApplicationWindowName
rc = SelectWindow() ; call LogFailure
rc = WhatWindow() ; call LogFailure
if rc <> 0 then return 1
if WhatWindowResult <> ApplicationWindowName then return 1
return 0
StartBeep:         /* This is the Beep Window model, it will set a beep
```

-continued

```
frequency & duration */
WindowName = BeepWindowName              /* and it will select any buttons that exist */
rc = SelectWindow() ; call LogFailure
rc = WhatWindow() ; call LogFailure
if rc <> 0 then return 1
if WhatWindowResult <> BeepWindowName then return 1
X = random(20,80)                        /* This is a poorman's slider bar manipulator.*/
Y = random(20,80)                        /* There should be a slider bar action in its place.
*/
call CLASS_SET_POINTER '#8',1,X,100,5,10           /* There are two reasons why you
don't see the action */
do j = 1 to 10                  /* and this instead. First is that I'm too lazy to */
    call MOUSE 'CLICK',1               /* design it. Second is without a slider bar
manipulator, */
end                            /* some critic will say "This ain't no good, because */
call CLASS_SET_POINTER '#8',2,Y,100,5,10   /* the slider bar doesn't work!" Hey,
this is a demo!! */
do j = 1 to 10
    call MOUSE 'CLICK',1
end
rc = WhatButtons() ; call LogFailure
if rc <> 0 then return 1
rc = PushButton() ; call LogFailure
return 0
/*
***********************************
* Actions
***********************************
*/
InitializeTestCase:
rc = INIT_SESSION() ; call LogFunction
return rc
StartProgram:
rc = START_PROGRAM(Application,"",WorkingDirectory) ; Call LogStartProgram
call WAIT random(100,1000)
return rc
SelectWindow:
rc = SELECT_WINDOW(WindowName,10) ; call LogSelectWindow
if WindowName = ApplicationWindowName then call WAIT 1000
call WAIT random(100,1000)
return rc
SelectMenuItem:
Choice = random(1,WhatMenuResult.0)
MenuItem = WhatMenuResult.Choice
rc = TestForMenuItemExceptions()
if rc <> 0 then signal SelectMenuItem
select
    when Level = 1 then do
        rc = MENU_SELECT(MenuItem) ; call LogSelectMenuItem
    end
    when Level = 2 then do
        rc = MENU_SELECT(Item1,MenuItem) ; call LogSelectMenuItem
    end
    when Level = 3 then do
        rc = MENU_SELECT(Item1,Item2,MenuItem) ; call LogSelectMenuItem
    end
    when Level = 4 then do
        rc = MENU_SELECT(Item1,Item2,Item3,MenuItem) ; call LogSelectMenuItem
    end
    when Level = 5 then do
        rc = MENU_SELECT(Item1,Item2,Item3,Item4,MenuItem) ; call
LogSelectMenuItem
    end
    when Level = 6 then do
        rc = MENU_SELECT(Item1,Item2,Item3,Item4,Item5,MenuItem) ; call
LogSelectMenuItem
    end
    when Level = 7 then do
        rc = MENU_SELECT(Item1,Item2,Item3,Item4,Item5,Item6,MenuItem) ; call
LogSelectMenuItem
    end
    when Level = 8 then do
        rc = MENU_SELECT(Item1,Item2,Item3,Item4,Item5,Item6,Item7,MenuItem) ;
call LogSelectMenuItem
    end
    when Level = 9 then do
        rc =
MENU_SELECT(Item1,Item2,Item3,Item4,Item5,Item6,Item7,Item8,MenuItem) ;
call LogSelectMenuItem
```

```
        end
    otherwise do
        call lineOut FailLog, "Test Case error caused by not defining or not having enough
levels in the SelectMenuItem subroutine"
        call lineOut FailLog
        return 1
    end
end
call WAIT random(100,1000)
return rc
PushButton:
Choice = random(1,Buttons.0)
Button =0 Buttons.Choice
rc = TestForButtonExceptions()
if rc <> 0 then signal PushButton
rc = PUSHBUTTON_CLICK(Button) ; call LogPushButton
call WAIT random(100,1000)
return rc
CloseWindow:
rc = SYSMENU_SELECT("Close") ; call LogFunction
call WAIT random(100,1000)
return rc
ByeBye:
rc = END_SESSION() ; call LogFunction
exit
/*
**********************************
* Queries
**********************************
    */
WhatWindow: procedure expose WhatWindowResult WindowName
j = 1
rc = 0
do while rc = 0
    rc = SELECT_WINDOW("*",1,j)
    if rc = 0 then do
        call QUERY_TITLE 'WhatWindowResult'
        if WhatWindowResult = WindowName then leave
        WhatWindowResult = ""
    end
    j = j + 1
end
if WhatWindowResult = "" then return 1
return 0
WhatMenu:
select
    when Level = 1 then rc = MENU_QUERY_ALL("WhatMenuResult")
    when Level = 2 then rc = MENU_QUERY_ALL(Item1,"WhatMenuResult")
    when Level = 3 then rc = MENU_QUERY_ALL(Item1,Item2,"WhatMenuResult")
    when Level = 4 then rc =
MENU_QUERY_ALL(Item1,Item2,Item3,"WhatMenuResult")
    when Level = 5 then rc =
MENU_QUERY_ALL(Item1,Item2,Item3,Item4,"WhatMenuResult")
    when Level = 6 then rc =
MENU_QUERY_ALL(Item1,Item2,Item3,Item4,Item5,"WhatMenuResult")
    when Level = 7 then rc =
MENU_QUERY_ALL(Item1,Item2,Item3,Item4,Item5,Item6,"WhatMenuResult")
    when Level = 8 then rc =
MENU_QUERY_ALL(Item1,Item2,Item3,Item4,Item5,Item6,Item7,"WhatMenuRes
ult")
    when Level = 9 then rc =
MENU_QUERY_ALL(Item1,Item2,Item3,Item4,Item5,Item6,Item7,Item8,"WhatMe
nuResult")
    otherwise do
        call lineOut FailLog, "Test Case error caused by not defining or not having enough
levels in the WhatMenu subroutine"
        call lineOut FailLog
        return 1
    end
end
if WhatMenuResult.0 = 0 | WhatMenuResult.0 = "" | WhatMenuResult.0 =
"WHATMENURESULT" then return 1
return 0
WhatButtons:
rc = PUSHBUTTON_QUERY_ALL("Buttons")
if Buttons.0 = 0 | Buttons.0 = "" | Buttons.0 = "Buttons" then return 1
return 0
WhatText:
call WAIT 500
```

-continued

```
rc = TEXT_QUERY_TEXT('1', "TEXT")
if Text = "" then return 1
Text = strip(Text)
return 0
/*
*****************************************
* Exceptions
*****************************************
*/
TestForMenuItemExceptions:
do j=1 to MenuItemException.0
    if MenuItem = MenuItemException.j then return 1
end
select
    when Level = 1 then rc = MENU_QUERY_STATE(MenuItem,State)
    when Level = 2 then rc = MENU_QUERY_STATE(Item1,MenuItem,State)
    when Level = 3 then rc = MENU_QUERY_STATE(Item1,Item2,MenuItem,State)
    when Level = 4 then rc =
MENU_QUERY_STATE(Item1,Item2,Item3,MenuItem,State)
    when Level = 5 then rc =
MENU_QUERY_STATE(Item1,Item2,Item3,Item4,MenuItem,State)
    when Level = 6 then rc =
MENU_QUERY_STATE(Item1,Item2,Item3,Item4,Item5,MenuItem,State)
    when Level = 7 then rc =
MENU_QUERY_STATE(Item1,Item2,Item3,Item4,Item5,Item6,MenuItem,State)
    when Level = 8 then rc =
MENU_QUERY_STATE(Item1,Item2,Item3,Item4,Item5,Item6,Item7,MenuItem,St
ate)
    when Level = 9 then rc =
MENU_QUERY_STATE(Item1,Item2,Item3,Item4,Item5,Item6,Item7,Item8,MenuIt
em,State)
    otherwise do
        call lineOut FailLog, "Test Case error caused by not defining or not having enough
levels in the TestForMenuItemExceptions subroutine"
        call lineOut FailLog
        return 1
    end
end
if State.3 = "DISABLED" | State.4 = "INVALID" then return 1
TestException = MenuItem
rc = TestForLearnedExceptions()
return rc
TestForButtonExceptions:
do j=1 to ButtonException.0
    if Button = ButtonException.j then return 1
end
TestException = Button
rc = TestForLearnedExceptions()
return rc
TestForLearnedExceptions:
FileName = TrainingFile||'.xxx'
rc = ReadFile()
if rc = 0 then do
    File.0=0
    call sysFileTree TrainingFile||'.x', 'File.', 'FO'
    if fILE.0 > 0 then do
        FileName = TrainingFile||'.x'
        rc = ReadFile()
    end
end
return rc
/*
*****************************************
* Logging
*****************************************
*/
LogFailure:
Code=Strip(rc)
if Code = 0 then return rc
parse value sourceline(sigl) with 'rc = 'Function' ;'
Out = Function 'on sourceline 'sigl' has failed'
if Learn = "On" then do
    call lineOut TrainingFile||'.f', Out
    call lineOut TrainingFile||'.f'
end
else do
    call lineOut FailLog, Out
    call lineOut FailLog
end
```

-continued

```
return rc
LogFunction:
Code=strip(rc)
parse value sourceline(sigl) with 'rc = 'Function';'
Out = 'Return code 'Code' from 'Function
if Learn = "On" & Function = "END_SESSION()" then return 0
if Learn = "On" then do
    call lineOut TrainingFile||'.t', Out
    call lineOut TrainingFile||'.t'
end
else do
    if TestLog = "TESTLOG" | TestLog = "" then return 0
    call lineOut TestLog, Out
    call lineOut TestLog
end
return rc
LogStartProgram:
Code=strip(rc)
parse value sourceline(sigl) with 'rc = 'Function' ;'
Out = 'Return code 'Code' from 'Function', Application = 'Application',
WorkingDirectory = 'WorkingDirectory
if Learn = "On" then do
    call lineOut TrainingFile||'.t', Out
    call lineOut TrainingFile||'.t'
end
else do
    call lineOut TestLog, Out
    call lineOut TestLog
end
return rc
LogSelectWindow:
Code=strip(rc)
parse value sourceline(sigl) with 'rc = 'Function' ;'
Out = 'Return code 'Code' from 'Function', WindowName = 'WindowName
if Learn = "On" then do
    call lineOut TrainingFile||'.t', Out
    call lineOut TrainingFile||'.t'
end
else do
    call lineOut TestLog, Out
    call lineOut TestLog
end
return rc
LogSelectMenuItem:
Code=strip(rc)
parse value sourceline(sigl) with 'rc = 'Function' ;'
Out = 'Return code 'Code' from 'Function', MenuLevel = 'Level', MenuItem =
'MenuItem
if Learn = "On" then do
    call lineOut TrainingFile||'.t', Out
    call lineOut TrainingFile||'.t'
end
else do
    call lineOut TestLog, Out
    call lineOut TestLog
end
return rc
LogPushButton:
Code=strip(rc
parse value sourceline(sigl) with 'rc = 'Function' ;'
Out = 'Return code 'Code' from 'Function', Button = 'Button
if Learn = "On" then do
    call lineOut TrainingFile||'.t', Out
    call lineOut TrainingFile||'.t'
end
else do
    call lineOut TestLog, Out
    call lineOut TestLog
end
return rc
/**********
* Training *
**********/
Training: procedure expose ShortFileLength TrainingFile Seed GoalNumber
TrainingCheck ShortSeed Result.0 CandidatePosition
Record.0 = 0
call sysFileSearch "failed", TrainingFile||'.f', 'Records.'
if Records.0 > 0 then do
    Seed = time('S')
```

```
        call random 1, Result.0, Seed
        say "failure"
        '@del 'TrainingFile||'.*'
        say "Training Error: a test case failed"
        return 1
    end
end
File.0 = 0
call sysFileTree TrainingFile||'.s', 'File.', 'FO'
if File.0 = 0 then do
    '@rename 'TrainingFile||'.t 'Training File||'.s'
    call sysFileSearch "Return code", TrainingFile||'.s', 'Records.'
    ShortFileLength = Records.0
    ShortSeed = Seed
    Seed = time('S')
    call random 1, Result.0, Seed
    say ShortFileLength
    say "no s record"
    return 0
end
call sysFileSearch "Return code", TrainingFile||'.t', 'Records.'
if Records.0 = ShortFileLength then do
    say ShortFileLength
    say "t = s record "
    call CleanUpTrainingFiles
    TrainingCheck = TrainingCheck + 1
    call sysFileTree TrainingFile||'.x', 'File.', 'FO'
    if File.0 > 0 then do
        Exception = lineIn(TrainingFile||'.x', 1, 1)
        call lineOut TrainingFile||'.x'
        say Exception "Exception"
        call lineOut TrainingFile||'.xxx', Exception
        call lineOut TrainingFile||'.xxx'
        '@del 'TrainingFile||'.x'
    end
    Seed = time('S')
    call random 1, Result.0, Seed
    return 0
end
TrainingCheck = 0
if Records.0 < ShortFileLength then do
    say ShortFileLength
    say "t < s record"
    '@del 'TrainingFile||'.1 2<null'
    '@rename 'TrainingFile||'.s 'TrainingFile||'.l'
    '@rename 'TrainingFile||'.t 'TrainingFile||'.s'
    ShortFileLength = Records.0
    ShortSeed = Seed
    File.0 = 0
    call sysFileTree TrainingFile||'.x', 'File.', 'FO'
    if File.0 > 0 then do
        Exception = lineIn(TrainingFile||'.x', 1, 1)
        call lineOut TrainingFile||'.x'
        say Exception "Exception"
        call lineOut TrainingFile||'.xxx', Exception
        call lineOut TrainingFile||'.xxx'
        '@del 'TrainingFile||'.x'
        Seed = time('S')
        call random 1, Result.0, Seed
        return 0
    end
end
else do
    say ShortFileLength
    say "t > s record"
    '@del 'TrainingFile||'.1 2> null'
    '@rename 'TrainingFile||'.t 'TrainingFile||'.l'
    call sysFileSearch "Return code", TrainingFile||'.l', 'LongFileLine.'
    call sysFileSearch "Return code", TrainingFile||'.s', 'ShortFileLine.'
    do j = 1 to ShortFileLine.0
        if LongFileLine.j <> ShortFileLine.j then leave
    end
    CandidatePosition = j
    do k = 1 to 5
        parse var LongFileLine.j Word LongFileLine.j
    end
    select
        when Word =
"MENU_SELECT(Item1,Item2,Item3,Item4,Item5,Item6,Item7,Item8,MenuItem),"
then do
```

```
              parse value LongFileLine.j with "MenuItem = "'TestException
       end
       when Word =
"MENU_SELECT(Item1,Item2,Item3,Item4,Item5,Item6,Item7,MenuItem)," then do
              parse value LongFileLine.j with "MenuItem = "'TestException
       end
       when Word =
"MENU_SELECT(Item1,Item2,Item3,Item4,Item5,Item6,MenuItem)," then do
              parse value LongFileLine.j with "MenuItem = "'TestException
       end
       when Word = ""MENU_SELECT(Item1,Item2,Item3,Item4,Item5,MenuItem),"
then do
              parse value LongFileLine.j with "MenuItem = "'TestException
       end
       when Word = ""MENU_SELECT(Item1,Item2,Item3,Item4,MenuItem)," then do
              parse value LongFileLine.j with "MenuItem = "'TestException
       end
       when Word = "MENU_SELECT(Item1,Item2,Item3,MenuItem)," then do
              parse value LongFileLine.j with "MenuItem = "'TestException
       end
       when Word = "MENU_SELECT(Item1,Item2,MenuItem)," then do
              parse value LongFileLine.j with "MenuItem = "'TestException
       end
       when Word = "MENU_SELECT(Item1,MenuItem)," then do
              parse value LongFileLine.j with "MenuItem = "'TestException
       end
       when Word = "MENU_SELECT(MenuItem)," then do
              parse value LongFileLine.j with "MenuItem = "'TestException
       end
       when Word = "PUSHBUTTON_CLICK(Button)," then do
              parse value LongFileLine.j with "Button = "'TestException
       end
       when Word = "PUSHBUTTON_CLICK("Done"), " then do
              parse value LongFileLine.j with '("'TestException'")'
       end
       when Word = "PUSHBUTTON_CLICK("Done")," then do
              parse value LongFileLine.j with '("'TestException'")'
       end
       when Word = "PUSHBUTTON_CLICK("OK")," then do
       parse value LongFileLine.j with '("'TestException'")'
       end
       otherwise return 0
       end
              say TestException "difference"
              FileName = TrainingFile||'.k'
              rc = ReadFile()
              if rc = 0 then do
              say TestException "candidate"
              call lineOut TrainingFile||'.x', TestException, 1
              call lineOut TrainingFile||'.x'
              call random 1, Result.0, ShortSeed
              call CleanUpTrainingFiles
              return 0
       end
end
Seed = times('S')
call random 1, Result.0, Seed
call CleanUpTrainingFiles
return 0
CleanUpTrainingFiles:
'@del 'TrainingFile||'.t 2>null'
'@del 'TrainingFile||'.f 2>null'
return 0
CleanUpApplication: procedure expose ApplicationWindowName
j = 1
rc = 0
do while rc = 0
     rc = SELECT_WINDOW("*",1,j)
     if rc = 0 then do
         call QUERY_TITLE 'WhatWindowResult'
         if WhatWindowResult = ApplicationWindowName then leave
         WhatWindowResult = ""
     end
     j = j + 1
end
j = 1
rc = 0
do while rc = 0
     rc = SELECT_WINDOW("*",1,j)
```

```
        if rc = 0 then do
            call QUERY_TITLE 'WhatWindowResult'
            if WhatWindowResult = ApplicationWindowName then do
                call KEYBOARD "F4", "A"
                return 0
            end
        end
        j = j + 1
end
return 0
ReadFile:
InputRecord = lineIn(FileName,1,1)
if InputRecord = TestException then return 1
do while lines(FileName) <> 0
    InputRecord = lineIn(FileName)
    if InputRecord = TestException then return 1
end
return 0
```

Although certain preferred embodiments have been shown and described, it will be understood that many changes and modifications may be made therein without departing from the scope and intent of the appended claims.

What is claimed is:

1. A method for automatically testing a software system, comprising:

defining a functional model of a system under test;

initiating a test of said system under test by executing a quasi-random action, wherein said quasi-random action is based on a statistical behavior of said functional model;

querying a result of said execution of said quasi-random action; and applying, responsive to said result, rules statistically defined for said functional model, wherein said rules modifies said test of said system under test.

2. The method as recited in claim 1, wherein said functional model is defined without requiring a complete description of said system under test.

3. The method as recited in claim 1, further comprising creating a trace log for preserving a history of said test.

4. The method as recited in claim 1, wherein said test includes functional testing of a main menu bar, drop-down menus and specialized windows of said system under test.

5. The method as recited in claim 1, further comprising defining goals of said test.

6. The method as recited in claim 1, further comprising specifying exceptions for said test.

7. A computer-readable medium having stored thereon computer executable instructions for implementing a method for automatically testing a software system, said computer executable instructions when executed perform:

defining a functional model of a system under test;

initiating a test of said system under test by executing a quasi-random action, wherein said quasi-random action is based on a statistical behavior of said functional model;

querying a result of said execution of said quasi-random action; and applying, responsive to said result, rules statistically defined for said functional model, wherein said rules modifies said test of said system under test.

8. The computer-readable medium as recited in claim 7, wherein said functional model is defined without requiring a complete description of said system under test.

9. The computer-readable medium as recited in claim 7, wherein said computer executable instructions further perform creating a trace log for preserving a history of said test.

10. The computer-readable medium as recited in claim 7, wherein said test includes functional testing of a main menu bar, drop-down menus and specialized windows of said system under test.

11. The computer-readable medium as recited in claim 7, wherein said computer executable instructions further perform defining goals of said test.

12. The computer-readable medium as recited in claim 7, wherein said computer executable instructions further perform specifying exceptions for said test.

13. A smart testing system for automatically testing a software system, comprising:

means for defining a functional model of a system under test;

means for initiating a test of said system under test by executing a quasi-random action, wherein said quasi-random action is based on a statistical behavior of said functional model;

means for querying a result of said execution of said quasi-random action; and means for applying, responsive to said result, rules statistically defined for said functional model, wherein said rules modifies said test of said system under test.

14. The smart testing system as recited in claim 13, wherein said functional model is defined without requiring a complete description of said system under test.

15. The smart testing system as recited in claim 13, further comprising means for creating a trace log for preserving a history of said test.

16. The smart testing system as recited in claim 13, wherein said test includes functional testing of a main menu bar, drop-down menus and specialized windows of said system under test.

17. The smart testing system as recited in claim 13, further comprising means for defining goals of said test.

18. The smart testing system as recited in claim 13, further comprising means for specifying exceptions for said test.

* * * * *